June 24, 1947.  L. A. MEACHAM  2,422,697
VIEWING SYSTEM
Filed Nov. 15, 1944  6 Sheets-Sheet 1

FIG. 1

INVENTOR
L. A. MEACHAM
BY
Franklin Mohr
ATTORNEY

June 24, 1947.  L. A. MEACHAM  2,422,697
VIEWING SYSTEM
Filed Nov. 15, 1944  6 Sheets-Sheet 2

FIG. 2

INVENTOR
L. A. MEACHAM
BY
Franklin Mohr
ATTORNEY

FIG. 5

June 24, 1947.  L. A. MEACHAM  2,422,697
VIEWING SYSTEM
Filed Nov. 15, 1944     6 Sheets-Sheet 6

INVENTOR
L. A. MEACHAM
BY
Franklin Mohr
ATTORNEY

Patented June 24, 1947

2,422,697

UNITED STATES PATENT OFFICE 2,422,697

VIEWING SYSTEM

Larned A. Meacham, Summit, N. J., assignor to Bell Telephone Laboratories, Incorporated, New York, N. Y., a corporation of New York Application November 15, 1944, Serial No. 563,559

9 Claims. (Cl. 161—15)

1

This invention relates to a viewing system utilizing oscilloscopes or the like and is particularly adaptable to time measuring and range indicating systems as well as to television systems in general.

An object of the invention is to present an over-all picture of an extended field of view, as by means of a main oscilloscope, and at the same time to present a magnified picture of any desired restricted portion of the field, as upon an auxiliary oscilloscope.

A feature of the invention is a movable mark appearing upon the over-all picture, which mark is controllable manually, so that it may be placed at any desired point in the field of view.

A further feature is an automatic coordination of the two viewing devices to make the magnified picture always centered in a predetermined relation to the selected point of interest in the over-all picture.

A more specific object of the invention is to correlate the starting of a time sweep circuit for an oscilloscope or the like with the production of an indication such as a range mark in a radar system in such a way that whatever the range selected, the time sweep will start a predetermined time before the range mark is produced and the range mark will always be located at approximately the middle of the screen of the oscilloscope.

The invention is illustrated as embodied in a radar system equipped with two cooperating oscilloscopes or other viewing devices one of which presents an over-all picture of the entire field of view of the radar system and the other of which operates with an expanded or magnified scale to show in greater detail any selected portion of the field of view of the main viewing device. Such a radar system has been called a dual purpose radar because it is useful not only for searching the field for objects of interest but also in examining more closely a selected object or for tracking a selected target as in a military use of the device.

The invention is described in detail hereinafter in relation to such a dual purpose radar.

Dual purpose radar

Figure 1:
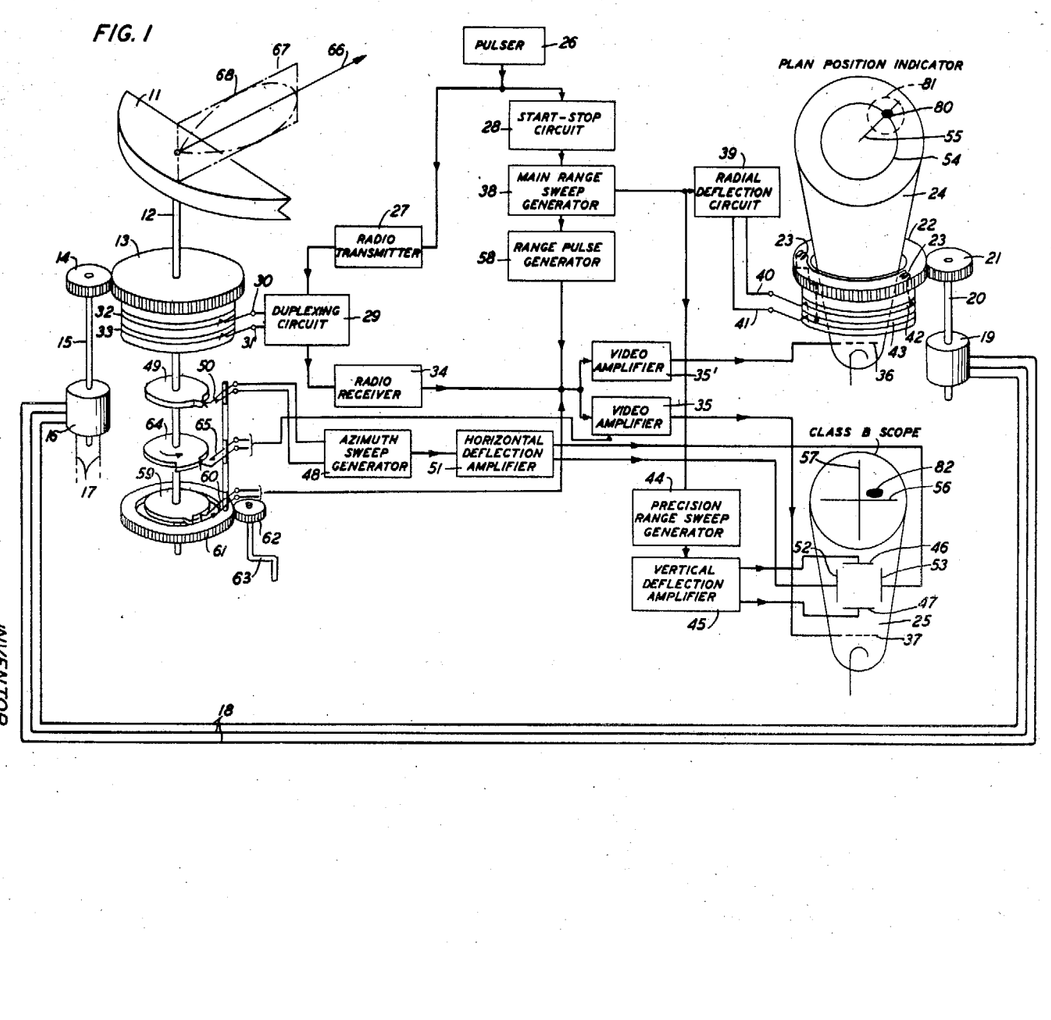
Fig. 1 is a general schematic diagram showing the principal features of the dual purpose radar with the present invention embodied therein.

Referring to Fig. 1, the general organization of the dual purpose radar is shown. A rotatable scanning antenna 11 is represented as being mounted upon a shaft 12 connected through gears 13 and 14 to a second shaft 15 which latter is rotatably driven as by a machine 16. It will be understood that, if desired, the machine 16 may be arranged to drive the shaft 12 directly instead of through the gearing 13, 14 and shaft 15. The machine 16 may function as an electric motor supplied with driving current through leads 17. In addition to its function as a motor, the machine 16 is designed to serve as a generator and to control through a set of output leads 18 the motion of a similar machine 19 in well-known manner so that the angular position of the rotor of the machine 19 may be made to follow and reproduce the angular position of the rotor of the machine 16. The machine 19, as through a shaft 20 and a gear 21, may drive another gear 22 carrying a rotatable deflection coil or coils 23 in proximity to a cathode-ray oscilloscope 24, whereby the indicating beam of the oscilloscope 24 when suitably adjusted may execute deflections in a radial direction bearing a constant angular relation at all times to the instantaneous direction scanned by the antenna 11. It will be understood that the machine 19 may be arranged to drive the coil 23 and its mounting directly instead of through the shaft 20 and the gear 21.

A second cathode-ray oscilloscope 25 is provided for viewing, effectively under magnification, any desired portion of the field of view of the oscilloscope 24. The component parts of the radar system whereby the scanning mechanism is activated and the oscilloscopes are made to produce their respective indications are shown in Fig. 1 in the form of a single line block diagram occupying the central portion of the drawing.

The radar is energized and synchronized primarily by means of a pulser 26 which may provide suitable pulses at a convenient rate such as 800 pulses per second. These pulses are supplied to a radio transmitter 27 and to a start-stop circuit 28. In the radio transmitter 27, each pulse energizes a component microwave generator for a brief period of the order of a microsecond to send a train of oscillations of about equally short duration through a duplexing circuit 29 of known form to the antenna 11 as by way of contacts 30, 31, slip rings 32, 33 and internal connections within the rotating system which are omitted for the sake of clarity. It will be understood that the contacts 30, 31 and slip rings 32, 33 are merely representative of any suitable means and will ordinarily be replaced as by wave guide connections adapted to transmit microwaves between two systems in relative motion, and which will function without material transmission losses. The oscillations reaching the antenna cause the emission of pulses therefrom in the form of an exploratory beam of wave energy.

Echo pulses from objects scanned are receivable by means of the antenna 11 and will be transmitted through the slip rings 32, 33 and contacts 30, 31 to the duplexing circuit 29 and thence to a radio receiver 34 where they may be amplified and detected to assume the form of video pulses which in turn may be amplified in video amplifiers 35 and 35'. The video pulses from amplifier 35' are impressed upon a suitable intensity control electrode 36 associated with the oscilloscope 24 and the video pulses from amplifier 35 are impressed upon an electrode 37 of similar function associated with the oscilloscope 25.

Both oscilloscopes 24 and 25 are arranged to give an indication in two dimensions, normally representing the range and azimuth respectively of points in the region scanned by the antenna 11. The oscilloscope 24 is adapted to function as what in military applications is commonly called a plan position indicator, which is a map producing device utilizing polar coordinates, the range of an object being indicated by the radial distance of a luminous mark from the center of the screen and the azimuth of the object being indicated by the angular position of the mark. The magnified representation on the screen of the oscilloscope 25 is preferably in rectangular coordinates, with the azimuth as abscissa and the range as ordinate, in military application commonly termed a class B indication. The system is so arranged that the center of the screen in the oscilloscope 25 automatically coincides at all times with a selected point of interest on the screen of the oscilloscope 24. Means are provided to produce luminous lines on the screen of the oscilloscope 24 which are movable with respect to the screen by means of manual controls. One of these lines is in the form of a circle concentric with the center of the screen and of variable radius corresponding to a selected calibrated range. The other line is a radial one adjustable in angular position according to any desired calibrated value of azimuth angle. Two luminous stationary lines are provided on the screen of the oscilloscope 25. These are at right angles to each other, one being vertical and the other horizontal and preferably they intersect at the center of the screen. The system automatically provides that the intersection of the fixed lines of the oscilloscope 25 always corresponds, as above mentioned, with the intersection of the movable lines on the screen of the oscilloscope 24.

The elements in the block diagram of Fig. 1 which enter into the provision of the scanning and marking functions will now be briefly identified.

The range sweeping and marking mechanism is controlled by the start-stop circuit 28 which is in turn synchronized with the exploratory beam of the antenna by pulses from the pulser 26. The start-stop circuit 28 is in immediate control of a main range sweep generator 38 which in turn controls a circuit 39 which supplies currents to the coil 23 as through suitable contacts 40, 41 and slip rings 42 and 43 associated with the element 22 for radial deflection of the electron beam. This takes care of the range sweep for the oscilloscope 24, the azimuth sweep for which is provided by the rotary motion of the coil 23.

The main range sweep generator 38 also controls the action of a precision range sweep generator 44 which passes voltage variations to a vertical deflection amplifier 45 which functions to impress suitable sweep potentials upon a pair of plates 46, 47 of the usual type for producing vertical deflection in the oscilloscope 25. The azimuth sweep for the oscilloscope 25 is generated in a circuit 48 which is energized and synchronized by means of a cam 49 and an associated switch 50 cooperating with the shaft 12. The azimuth sweep generator circuit passes potential variations to a horizontal deflection amplifier 51 which in turn impresses suitable deflecting potentials upon a pair of plates 52 and 53 for producing horizontal deflection in the oscilloscope 25.

In the plan position indicator, comprising the screen of the oscilloscope 24, the range mark is indicated in Fig. 1 by a circle 54 while the azimuth mark appears as a radial line 55. On the screen of the oscilloscope 25, which may be called the class B scope, the range mark appears as a horizontal line 56 and the azimuth mark as a vertical line 57.

The range marks 54 and 56 are produced by generating a delayed pulse which follows at a predetermined interval after an exploratory pulse leaves the antenna 11. The delayed pulses are generated in a range pulse generator 58 under the control of the main range sweep generator 38. The delayed pulses are fed through the video amplifiers 35' and 35 to the beam intensity control elements 36 and 37, respectively. In the oscilloscope 24, the delayed pulses cause the formation of a succession of dots arranged to form the circle 54. In the oscilloscope 25 the delayed pulses form another series of dots arranged to generate the line 56.

The azimuth marks are produced under the control of a cam 59 driven by the shaft 12 to operate a switch 60 to produce a momentary effect in the video amplifiers 35 and 35' at each instant when the antenna 11 is pointed in a predetermined direction.

Another cam 64 may be mounted upon the shaft 12 to control a switch 65 and associated mechanism for blanking the video amplifier 35 except over the limited range of azimuth shown in the class B scope, so as to reduce glare in the class B indication.

The switches 50, 60 and 65 are, by suitable angular placement of the cams 49, 59 and 64 respectively, made to operate in a fixed time relationship to each other and, as a group, are made rotatably adjustable with respect to the pointing of the antenna and thus with respect to the field of view, as by mounting upon a gear 61, angularly slidable upon the shaft 12 and adjustable in any convenient manner as by means of a spur gear 62 and a crank 63.

The antenna 11 is preferably highly directional, and for best results in certain applications, as for example, in searching for objects or targets, the directional selectivity should be very great with respect to azimuth but should be rather broad with respect to elevational angles. In Fig. 1, the direction of pointing of the antenna at the instant shown is represented by an arrow 66. A dot-dash line 67 in the form of a quadrilateral indicates as in perspective a vertical plane through the arrow 66, and a curve 68 represents, in polar coordinates on the vertical plane, the selectivity characteristic of the antenna with respect to elevational angle.

*Graphical presentation of wave shapes*

Figure 3:
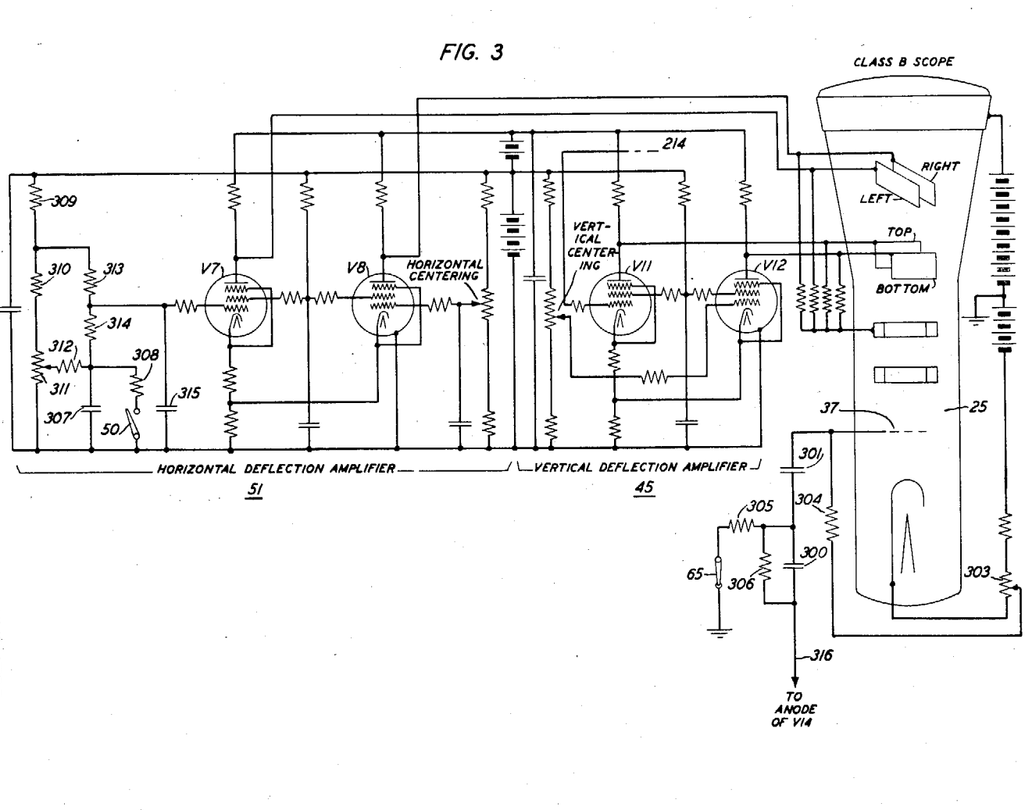
Fig. 3 is a schematic circuit diagram of the oscilloscope for presenting the detailed view of a selected portion of the field, and of the circuits of the horizontal and vertical deflection amplifiers for the oscilloscope.
Figure 4:
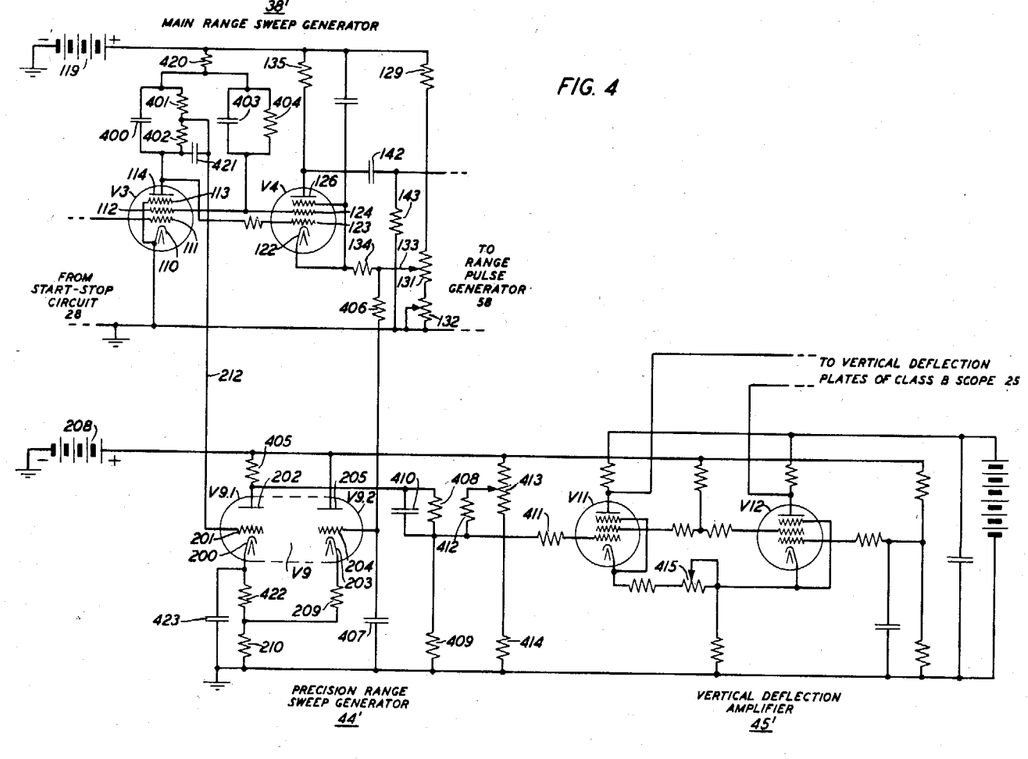
Fig. 4 is a schematic diagram of an alternative circuit arrangement embodying the invention.
Figure 5:
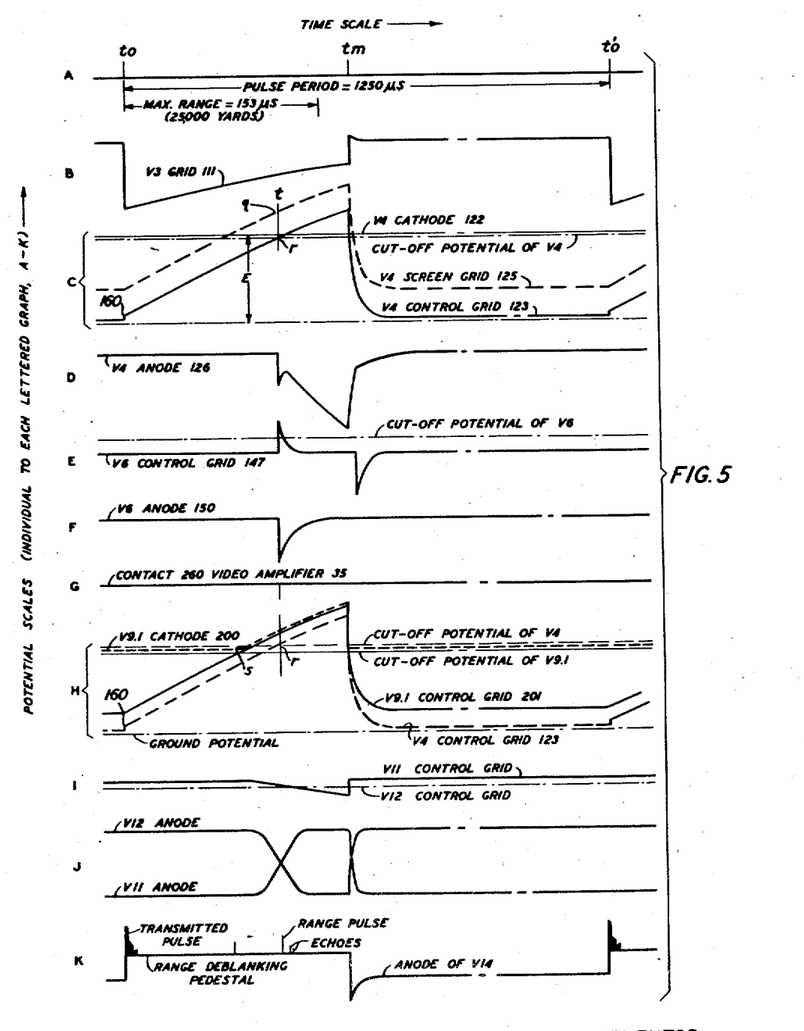
Figs. 5 and 6 are sets of graphs showing the variation of potential with time in various portions of a circuit employing the invention.
Figure 6:
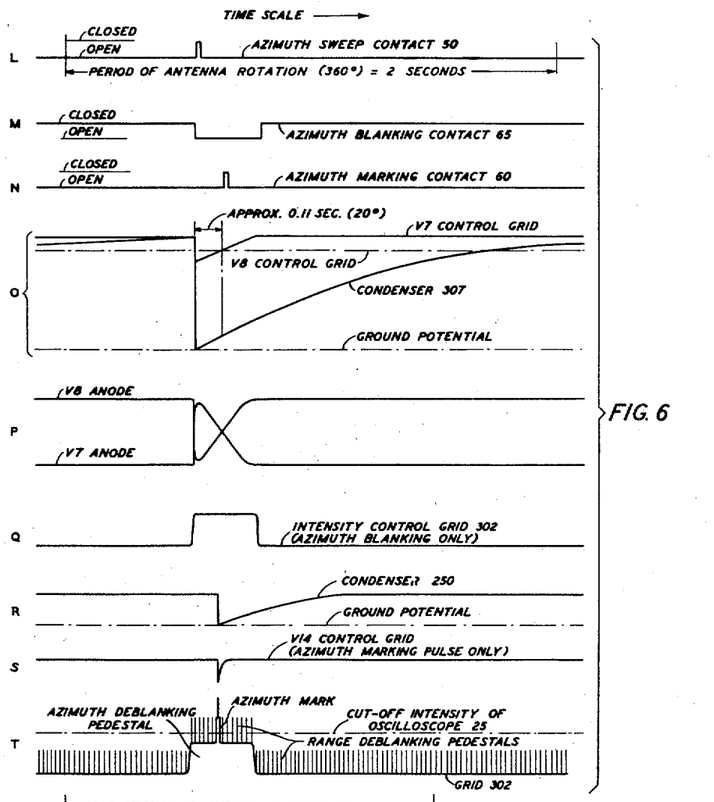

The respectively lettered graphs B to T, inclusive, in Figs. 5 and 6, illustrate typical potential variations at specified points in the systems illustrated schematically by the Figures 1 to 4, inclusive. Reference will be made to the graphs in connection with the description of the other figures. Graph A shows for reference a sequence of events entering into the utilization of the system of the invention, as, for example, in a radar of the type described. The instant $t_0$ represents the start of a typical recurrent range pulse period. The instant $t_0'$ represents the end of the pulse period which started at the instant $t_0$, or the beginning of the next succeeding period. In the case chosen for illustration herein, the range pulse period, or briefly the pulse period, has a duration of 1250 microseconds. The system is designed to measure distances up to a maximum of 25,000 yards, requiring that the apparatus have an active period of at least 153 microseconds, this being the time taken by an electromagnetic pulse in traveling out a distance of 25,000 yards and returning to the radar. The instant $t_m$ represents the end of the active portion of the pulse period and marks the beginning of a rest interval extending from $t_m$ to $t_0'$. The time scale is identical in the several graphs making up Fig. 5. The time scale in Fig. 6 is less extended than that in Fig. 5. A complete period of the antenna rotation is shown in Fig. 6, representing 360 degrees revolution, which in the system illustrated occupies two seconds.

The circuits for generating the precision range and azimuth sweeps and for coordinating the intersection of the lines 56 and 57 in the class B scope 25 with the intersection of the lines 54 and 55 in the plan position indicator 24 will now be described together with such other circuits as are necessary or helpful to a full understanding of the invention.

*Start-stop circuit*

Figure 2:
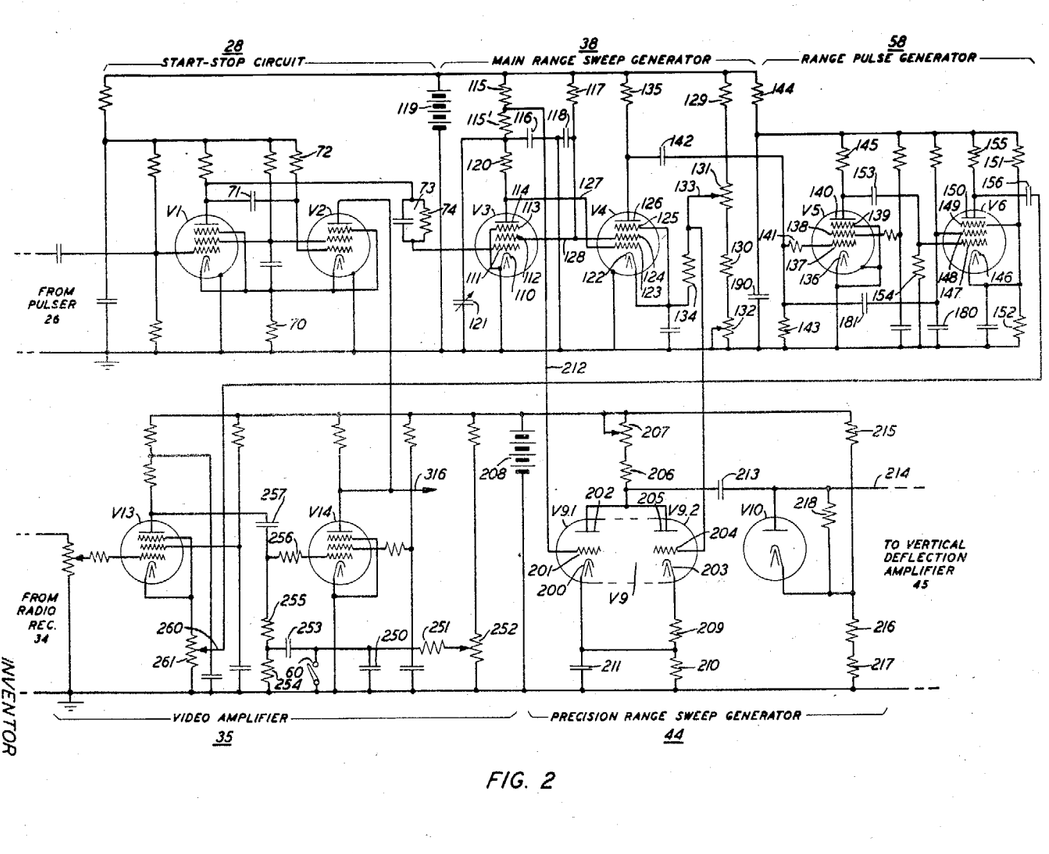
Fig. 2 is a schematic circuit diagram showing in detail those portions of the radar embodying the invention.

Referring to Fig. 2, positive synchronizing pulses as from the pulser 26 are effective to start the operation of the start-stop circuit 28 which may be a single-cycle multivibrator employing cathode feedback. The multivibrator may comprise a pair of pentodes V1 and V2 coupled by a common cathode resistor 70 and by a condenser 71, the latter connecting the anode of V1 to the control grid of V2. The interval between the instants $t_0$ and $t_m$ is determined primarily by the time constant of the combination comprising the condenser 71 and an associated resistor 72. The recovery of the multivibrator, after $t_m$, is rapid and may be much less than the time interval between the instants $t_m$ and $t_0'$. However, as the multivibrator does not begin a new cycle until the following synchronizing pulse is received, as at $t_0'$, the pulse rate may be chosen so as to allow any desired interval between $t_m$ and $t_0'$.

The start-stop circuit 28 may perform two functions. Primarily, it supplies to the grid 111 of a tube V3 in the main range sweep generator 38 a wave of abrupt potential changes (graph B, Fig. 5), of which the more negative portion, starting at time $t_0$, initiates the range measurement and the more positive portion, starting at $t_m$, starts the recovery of the measuring circuit toward its normal rest condition. Second, the start-stop circuit 28 may supply a similar wave of reversed polarity to the video amplifiers 35 and 35' to provide a deblanking pedestal wave (graph K, Fig. 5) for the range scanning.

Pentode tubes have been found particularly suitable for V1 and V2 to secure very steep wave fronts with minimum delay in response to the synchronizing pulses, and to protect the start-stop circuit from the effects of video pulses that are impressed on the anode of V2 by a tube V14 in the video amplifier 35 or 35' during normal operation.

*Main range sweep generator*

Referring to Fig. 2, the main range sweep generator 38 comprises a pair of vacuum tubes V3 and V4 preferably pentodes. The tube V3 has a cathode 110, a control grid 111, a screen grid 112, a suppressor grid 113 and an anode 114. The control grid 111 may be connected as through a parallel combination of a condenser 73 and a resistor 74 to the anode of V1. The cathode 110 may be grounded. A pair of resistance-capacitance timing circuits are provided under the control of the tube V3 comprising respectively resistors 115 and 115' in series with a condenser 116 and a resistor 117 in series with a condenser 118. The timing circuits are parallel-connected with respect to a suitable source of steady electromotive force which is represented as a battery 119. The tube V3 is so connected to the timing circuits that the anode-cathode path of the tube, preferably in series with a resistor 120, forms a shunt across the condenser 116 and the screen grid-cathode path forms a shunt across the condenser 118. For accurate adjustment a variable condenser 121 should be connected in parallel with the condenser 116 as shown. The tube V3 serves to control the charging and discharging of the timing circuits and is in turn controlled by impulses impressed upon its control grid from the anode of V1.

The tube V4 has a cathode 122, a control grid 123, a screen grid 124, a suppressor grid 125 and an anode 126. The control grid 123 and the screen grid 124 are provided with direct conductive connections through leads 127 and 128, respectively, to the anode 114 and the screen grid 112 of the tube V3. Between the cathode 122 and ground there is included a variable potential from a potentiometer circuit connected across the source 119. The potentiometer circuit may include fixed resistors 129 and 130, an adjustable potentiometer 131 and a rheostat 132. The cathode 122 may be connected to a movable arm 133 of the potentiometer 131 as through a resistor 134. The anode 126 of the tube V4 is preferably connected through an anode circuit resistor 135 to the positive terminal of the source 119. The tube V4 serves to produce a sudden increment of voltage when a critical relationship of potentials is present due to the combination of a potential supplied to the control grid 123 from the tube V3 and a potential supplied to the cathode 122 by the potentiometer 131, whereby the tube V4 suddenly becomes conducting, as will be more fully described hereinafter.

Range pulse generator

The range pulse generator 58 may comprise vacuum tubes V5 and V6, preferably pentodes. The tube V5 may have a cathode 136, a control grid 137, a screen 138, a suppressor grid 139 and an anode 140. The cathode 136 may be grounded. The control grid 137 may be connected as through a resistor 141 to the junction of a condenser 142 and a resistor 143 in the anode circuit of the tube V4. The anode 140 should be provided with an anode circuit resistor 145.

If desired, sharp pulses of anode current drawn by the tubes V5 and V6 may be kept from possibly disturbing the constancy of the voltage of the source 119 by means of a filter comprising a series resistor 144 and a by-pass condenser 190. The tube V6 may have a cathode 146, a control grid 147, a screen grid 148, a suppressor grid 149, and an anode 150. The cathode 146 may be connected to the intermediate point of a potential divider comprising resistors 151 and 152. The control grid 147 may be connected to the common terminal of a condenser 153 and a resistor 154 in the anode circuit of the tube V5. The anode 150 of the tube V6 should be provided with an anode circuit resistor 155 and may be connected as through a condenser 156 to a movable contact 260 of a potentiometer 261 in the video amplifiers 35 and 35', which amplifiers may be similarly composed. The tubes V5 and V6 comprise a pulse generating system which is under the control of the tube V4 as more fully described hereinafter.

Operation of main range sweep and range pulse generators

In operation, the tube V3 is normally held conducting by a positive potential impressed upon the control grid 111 from the anode of V1 through the condenser 73 and resistor 74. In this condition, the tube V3 acts substantially as a short circuit across both timing condensers 116 and 118. When the potential impressed upon the control grid of V3 is suitably altered, the tube suddenly becomes non-conducting thereby permitting charging currents to flow into the condensers 116 and 118 from the source 119 through the respective resistors 115, 115' and 117. The grid-cathode circuit of the tube V4 is initially controlled by a positive bias impressed upon the cathode 122 from the potentiometer 131 to hold V4 non-conducting. This initial bias is opposed increasingly during the charging period by a positive potential impressed upon the control grid 123 through the lead 127 from the anode 114 of the tube V3. After a time interval controlled by the setting of the potentiometer arm 133, the positive potential upon the grid 123 becomes sufficient to render the tube V4 suddenly conducting with a resulting sharp decrease in the potential of the anode 126 due to the passage of current through the resistor 135, (graph D, Fig. 5). The negative voltage increment thus generated is impressed by means of the coupling elements 142 and 143 upon the control grid 137 of the tube V5. The application of this pulse causes the tube V5, initially conductive in the absence of any negative bias on the control grid, to become suddenly non-conducting thereby raising the potential of the anode 140 and impressing a short positive pulse upon the control grid 147 of the tube V6 (graph E, Fig. 5) through the instrumentality of the condenser 153 and the resistor 154, which may be so chosen as to have a suitably small time constant. The tube V6, (graph F, Fig. 5) suddenly becoming conducting impresses a voltage increment upon the circuit branch comprising the condenser 156 and the lower portion of the potentiometer 261 through contact 260 (graph G, Fig. 5) due to the effect of the resistor 155 in the same manner as before thereby generating a very sharp negative pulse. As tube V6 becomes conducting, it also causes a negative pulse to be transmitted from the screen 148 through the condenser 181 to the grid 137 of tube V5. This pulse reenforces the negative voltage increment produced by tube V4 as previously described, and thus provides a triggering action, increasing the sharpness of the range pulse.

A more detailed description of certain aspects of the operation of this portion of the system of Fig. 2 will now be given.

Between the time $t_0$ and the time $t_m$, the wave impressed upon the control grid 111 of the tube V3 produces a negative bias thereby holding the tube in the non-conducting condition. At the time $t_m$, the impressed wave is made positive rendering the tube V3 conducting, which condition should obtain until time $t_0'$ at which time the impressed wave should suddenly become negative again. A suitable impressed wave exemplified in Fig. 5, graph B, is readily supplied by known methods as from the start-stop circuit 28.

During the rest interval before the time $t_0$, the impressed wave preferably maintains the control grid 111 at a positive potential with respect to the cathode 110, thereby permitting the passage of a moderate amount of grid current. Under this condition, the anode 114 may rest at a very low potential as, for example, about two volts above ground. The screen grid 112 may also draw current through the resistor 117 and may rest at a predetermined higher potential as, for example, about 30 volts above ground. At the time $t_0$, the grid 111 is carried sharply negative by the impressed wave and the anode and screen grid currents of the tube V3 are suddenly interrupted. The condensers 116 and 118, associated respectively with the anode 114 and the screen grid 112 are thereby charged through the anode and screen grid resistors 115, 115' and 117, respectively. The exponentially rising potential curves of both resistors approach the full supply voltage of the source 119 as an asymptote, which may, for example, be 300 volts. At the instant $t_m$, the impressed wave restores conduction through V3, which, because of the momentarily high voltages on the screen grid and anode, passes large currents and rapidly discharges the condensers 116 and 118 to the rest condition.

At the instant $t_0$, the first effect of the interruption of the anode current flowing through the resistor 120, is to cause an abrupt increase in the potential of the anode 114. The amount of this potential increase may be predetermined as by suitably selecting the resistance value of the resistor 120. In the system illustrated, the anode current before interruption is 1.5 milliamperes and the resistor 120 is 1,000 ohms, giving a potential rise of 1.5 volts. This rise is accomplished very rapidly and brings the anode potential up to the potential then existing at the junction of the resistor 120 and the condenser 116. The time constant which determines the rate of increase of the anode potential is very small, being equal to the product of the resistance of the resistor 120 and the capacitance inherent between ground and the conductors comprising the anode 114 of V3 and the control grid 123 of V4, estimated at about 0.02 microsecond when V3 is a tube known as 6V6–GT and V4 is a 6AC7. The initial potential rise or step is indicated at the point 160 in graph C. The purpose of the step 160 is to allow the range mark in the radar system to be produced as soon as desired after the instant $t_0$ without danger of producing spurious output pulses (when $t$ and $t_0$ are made coincident or nearly so), as will be more fully described hereinafter. The interelectrode shielding of a pentode in the position of V3 prevents the large transient potential on its control grid, at time $t_0$, from distorting the step 160 or disturbing the essential linearity of the early portion of the potential rise on the condenser 116.

Synchronously with the step 160, the timing condenser 116 and the trimming condenser 121 begin to be charged through the resistors 115 and 115'. The time constant of this, the anode charging circuit, may conveniently be chosen so that the voltage across the condenser 116 will attain a predetermined fraction such as one-third of the potential difference between the starting point and the 300-volt asymptote in the time corresponding to the full range of 25,000 yards. For a delay of 152.6 microseconds corresponding to the maximum range of 25,000 yards, the time constant RC may be calculated from the well-known law of charging circuits by use of the following equation:

$$E_0\left(1 - \epsilon^{\frac{t}{RC}}\right) = \frac{1}{3}E_0$$

In the present example, the time $t$ is 152.6 microseconds and the value of the time constant (RC) is calculated to be 376 microseconds. Here $E_0$, the asymptotic voltage, cancels out of the calculation.

It is necessary that some specific fraction of the asymptotic voltage be used so that the potentiometer 131 may be designed accordingly. A choice of one-third represents what was found to be a good compromise in a particular case between the need to use as much of the steep early part of the charging curve as possible for the sake of precision and the desirability of keeping the cathode 122 near enough to ground potential to avoid using a special ungrounded filament transformer winding in the heating circuit for the cathode 122.

Figure 7:
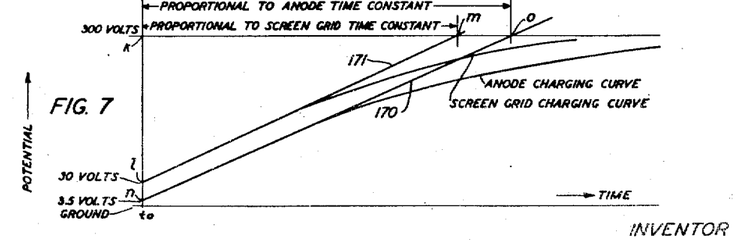
Fig. 7 is a diagram useful in explaining the calculation of a suitable time constant for one portion of the timing circuit of Fig. 2.

The time constant of the screen grid charging circuit is preferably chosen so that the charging curve for the screen grid circuit shall remain substantially parallel to the charging curve for the anode throughout the active period. Assuming that, in the present case, the screen grid potential starts at a known differential above the anode potential, this differential should be maintained with good accuracy over the useful portion of the charging period. In the system illustrated, 26.5 volts is the potential difference between the screen grid and the anode when charging begins; the difference being composed of the initial 28-volt difference (between 30 volts and 2 volts) diminished by the 1.5 volts of the step 160. It has been found satisfactory to use an approximate parallelism of the charging curves which is obtainable by starting the screen grid curve with the same slope as the anode curve as shown diagrammatically in Fig. 7. Although the curvatures of the two charging curves are not made identical by this procedure, the resultant error in parallelism has been found to be of negligible effect. Accordingly if tangents to the charging curves at the time $t_0$ are extended to meet the asymptote at 300 volts, as indicated by the parallel lines 170 and 171 in Fig. 7, there can be formed two similar triangles $klm$ for the screen grid circuit and $kno$ for the anode circuit. The horizontal sides $km$ and $ko$ of the respective triangles are proportional to the time constant of the screen grid and anode charging circuits under the given condition. From the similarity of the triangles, the screen grid time constant may be calculated as follows:

Screen grid time constant equals $$\left(\frac{300-30}{300-3.5}\right)(376) = 342 \text{ microseconds}$$

To secure precision in the range calibration, wire wound resistors and silvered-mica condensers are preferably used in both the anode and screen grid circuits and temperature control within plus or minus 1° F. at about 140° F. is desirable. The effect of temperature variations upon the calibration has been estimated at about 0.01 per cent per degree Fahrenheit of which about 0.008 per cent per degree Fahrenheit is attributable to the resistor and 0.001 per cent per degree Fahrenheit to the condenser.

It will be noted that because of the two nearly parallel exponentials, the screen potential of V4 is always the same with respect to the control grid, and hence also with respect to the cathode of the V4, at the instant of the start of conduction regardless of the setting of the potentiometer 131. In other words, the vertical distance between points $q$ and $r$ (graph C) is constant for all cathode potentials employed. The use of the two charging circuits to improve the precision of production of the range mark is disclosed and claimed in my copending application Serial No. 563,558, filed November 15, 1944, assigned to the assignee of the present application.

In graph C the cathode potential of V4 is shown, to avoid confusion, as a straight line. Actually, the passage of plate current through V4 during the interval between $t$ and $t_m$ causes the cathode to rise along with the R.-C. grid wave, and for short range settings grid current limits the rise of the R.-C. wave soon after time $t$. The resistor 134 allows the cathode to follow the grid for some distance before grid current is drawn, even at zero range where the resistance in the cathode path through the range potentiometer 131 would otherwise be low. This postponement of grid current is necessary because in accordance with the invention a section of the exponential before and after the production of the range mark is to be amplified to form the precision range sweep; that part of the exponential must therefore be undistorted.

*Precision range sweep generator*

The precision range sweep generator 44 comprises a pair of triodes V9.1 and V9.2, which may if desired be combined in one envelope as a double triode V9; and a diode V10, and associated circuits. The triode stage V9.1 with a cathode 200, a control grid 201 and an anode 202 and triode stage V9.2 with a cathode 203, a control grid 204 and an anode 205, may have their anodes connected through a common anode resistor 206 and rheostat 207 to the positive terminal of a source 208 of steady electromotive force. The cathode 203 may be grounded through a voltage divider comprising resistors 209 and 210, the cathode 200 being preferably connected to the junction of these resistors. The resistor 210 may be shunted by a by-pass condenser 211 of low capacitance. The grid 201 is connected through a lead 212 preferably to the junction of the resistors 115 and 115' in the anode circuit of V3. The grid 204 is connected to the potentiometer arm 133 in the cathode circuit of V4. The anodes 202 and 205 are connected, as through a condenser 213 to a lead 214 going to the vertical deflection amplifier 45 (Fig. 3). A potential divider comprising resistors 215, 216 and 217, is preferably provided across the terminals of the source 208, so that the diode V10 may be connected between the lead 214 and the junction of the resistors 215 and 216, as shown. The diode V10 may be shunted by a resistor 218.

In the operation of the precision range sweep generator 44, the stages V9.1 and V9.2 perform the function of picking up a section of the R. C. transient wave, as illustrated in graph H, Fig. 5. Before the start of the R. C. wave, the stage V9.2, acting as a conventional cathode follower, conducts enough current so that its cathode 203 rests slightly above the potential of the potentiometer arm 133. During this period the stage V9.1 is cut off, except at very short ranges, because its cathode 200 is raised to nearly the same potential as the cathode 203 of V9.2, while its grid 201 rests at, say, only 2 volts above ground. As soon as the R. C. wave carries the grid 201 through the cut-off potential of V9.1, however, V9.1 begins to conduct, its cathode following the R. C. wave from that point on. As the cathode 203 of V9.2 is thereby raised in potential, its conduction rapidly decreases to zero, the load being taken over by V9.1. Neither V9.1 nor V9.2 draws grid current; hence (except for the addition of the small constant interelectrode capacity of V9.1 across the R. C. circuit) the pick-up has no effect upon the range unit calibration. Whatever current flows through the cathodes of V9.1 and V9.2 must also flow through the common anode resistors 206 and 207. Consequently an inverted copy (graph I, Fig. 5) of the cathode signal appears on the anodes 202 and 205 and is transmitted through the condenser 213 to the input grid of the vertical deflection amplifier tube V11 via the lead 214. The rheostat 207 provides for the adjustment of the degree of sweep expansion and hence of image magnification. The diode V10 has the function of rapidly restoring the normal "rest" charge on the condenser 213, and thus stabilizing the starting point of the sweep at a voltage determined by the potential divider 215, 216, 217, regardless of possible variations in the pulse rate.

In order that the sweep may start at the proper time in advance of the range mark, the exponential potential supplied to the grid 201 of V9.1 is taken from a tap (between 115 and 115') on the anode circuit timing resistance of V3. Graph H shows the relationship between the voltages on the grids of V9.1 and V4. The two exponentials have the same time constant and same asymptote, but different amplitudes. In graph H, point $r$ represents the tripping of the range pulse generator 58, and point $s$ indicates the beginning of conduction in V9.1.

Since full range corresponds to one-third of the total rise of the exponentials, the voltage difference between them at maximum range is one-third less than it is at zero range. In consequence, the range mark would move closer to the start of the sweep, as the range setting was increased, if it were not for a certain compensation which is provided by the voltage divider 209, 210. As the cathode potential of V9.2 rises with increasing range, this divider lowers the cathode potential of V9.1 progressively below that of V9.2, thus causing the sweep to start progressively earlier than it would do otherwise. When this voltage divider is given the same ratio as that of the resistors 115 and 115', the range mark is found to remain centered on the screen for all range settings beyond about 2,000 yards.

It should be noted that a sweep produced in this way does not have the same degree of expansion at all range settings, for the slope of the exponential is one-third less at maximum range than at zero. Of course, the sweep circuit compensates for this by varying the time interval between the start of the sweep and the range mark. In the case illustrated, the expansion varies from about 4000 yards, near zero range, to about 6000 yards at maximum range. The portion in view at any one range setting is small enough to appear essentially linear.

At a setting of about 2000 yards, the cut-off potential of V9.1 coincides with the actual rest potential of its grid (prior to time $t_0$, and accordingly V9.1 follows the exponential from its very beginning. Further reduction of the range setting does not affect the shape or time of starting of the sweep signal; the grid of V9.2 remains below its cut-off potential, leaving V9.1 unaffected by the range setting in this region. The effect of this upon the B scope pattern (oscilloscope 25) is that as the range decreases below about 2000 yards the range index no longer remains centered on the screen, but moves smoothly downward toward the starting point of the precision sweep, while the outgoing pulse and echoes from stationary targets remain fixed in position.

An arrangement whereby the range index is made to remain centered at all ranges down to zero will be described hereinafter in connection with an alternative form of range sweep generating system.

Vertical deflection amplifier

The vertical deflection amplifier 45, Fig. 3, is preferably of the type which converts a single phase input wave into a balanced push-pull output wave and which effects the necessary phase inversion by means of a common cathode circuit for two vacuum tubes to provide cathode feedback. In accordance with the wave form (I, Fig. 5) of the precision sweep signal, the electron beam of the oscilloscope rests between sweeps on the side of the screen from which the sweep starts (rather than hopping across immediately in advance of the sweep as is commonly the case in other sweep systems). This arrangement is preferred because it allows rather large values of plate resistance to be used without introducing excessive delay. This of course saves power and allows the circuit to be designed for large sweep voltages on the deflection plates. The direct current characteristics of the amplifier for the optimum setting of the grid potential of V12 are shown in graph J, Fig. 5. In a particular design, the average of the two plate potentials for this condition remains constant within plus or minus 3.5 volts throughout the sweep, a feature which aids in maintaining sharp focus of the electron beam wherever it may fall on the screen.

Alternative range sweep generator

Fig. 4 shows an alternative arrangement of circuits for the main range sweep generator, the precision range sweep generator and the vertical deflection amplifier, the alternative circuits being designated 38', 44' and 45', respectively.

The alternative main generator 38' includes the vacuum tubes V3 and V4 in substantially the same arrangement as in the main range sweep generator 38. Instead of the series-connected resistance-capacitance timing circuits, the alternative circuit comprises parallel-connected timing circuits including a condenser 400 in parallel with a series combination of resistors 401 and 402 and a condenser 403 in parallel with a resistor 404.

In operation, the tube V3, as before, is normally held conducting by a positive potential impressed upon the control grid 111 from the start-stop circuit 28. In this condition, the tube V3 acts substantially as a grounding conductor for the condensers 400 and 403, completing the connection of each condenser as a series element between the positive terminal of the source 119 and ground (preferably through a step-producing resistor 420). As before, the anode 114 may rest at a very low potential as, for example, about 2 volts above ground and the screen grid 112 at about 30 volts above ground. At the time $t_0$ the grid 111 is carried sharply negative by the impressed waves and the anode and screen grid currents of the tube V3 are suddenly interrupted. The condensers 400 and 403, associated respectively with the anode 114 and the screen grid 112 are thereby disconnected from ground and allowed to discharge through their respective parallel-connected resistors. As the discharge proceeds, the potentials of the anode 114 and the screen grid 112 rise exponentially to approach the full supply voltage of the source 119. At the instant $t_m$, the impressed wave restores conduction through V3, which, because of the momentarily high voltages on the screen grid and anode, passes large currents and rapidly recharges the condensers 400 and 403 to reestablish the rest condition. The connections and operation of the tube V4 are substantially the same as described in connection with the operation of the main range sweep generator 38.

The resistor 420 performs the same function in the circuit of Fig. 4 as the resistor 120 performs in the circuit of Fig. 2, producing the step 160, which is here supplied to both the range pulse generator and the precision sweep generator.

The precision range sweep generator 44' has the anodes 202 and 205 separately connected to the source 208, the anode 202 being provided with an anode circuit resistor 405. The connection from the potentiometer arm 133 to the grid 204 of the tube V9.2 is made through a resistor 406 and the grid 204 is by-passed to ground through a condenser 407. The anode 202 is connected to ground through a potential divider comprising resistors 408 and 409, the former of which may be shunted by a condenser 410 of low capacitance. The junction of the resistors 408 and 409 is connected to the control grid of the tube V11 in the vertical deflection amplifier 45' through a series resistor 411. The junction point of the resistors 408 and 409 is also connected through a resistor 412 to the movable arm of a potentiometer 413, which potentiometer together with a resistor 414 comprises a potential divider between the positive terminal of the source 208 and ground. In the cathode circuit of the tube V11 there is provided a rheostat 415.

In the cathode circuit of V9.1, a feedback resistor 422 is provided which together with the resistor 405 determines the gain of V9.1 while it is amplifying the useful part of the sweep wave. The resistors 422 and 210 may be by-passed by a condenser 423.

The operation of the alternative precision sweep generator 44' is generally similar to that of the generator 44. An essential difference, however, appears due to the substitution of a resistance coupling for a condenser coupling between the precision sweep generator and the vertical deflection amplifier. In the generator 44, the coupling to the vertical deflection amplifier is by way of the condenser 213. As heretofore explained, the diode V10 has the function of stabilizing the starting point of the sweep at a voltage determined by the potential divider 215, 216, 217, regardless of possible variations in the pulse rate. This action continues regardless of the range setting, and consequently when the range is set at less than about 2,000 yards the range index no longer remains centered on the screen, but moves towards the starting point of the precision sweep. In Fig. 4, the effect of the condenser 213 is absent and the range mark remains centered at all ranges, including those from 2000 yards down to zero.

Another essential difference between generators 44' and 44 is that the step 160, which in generator 44 is supplied only to the grid 123 of tube V4, is in the case of generator 44' supplied from the rearranged R. C. circuits of tube V3, to both the grid 123 of V4 and the grid 201 of V9.1. The condensers (of small capacitance) numbered 421, 423, and 410 have for their chief purpose the faithful transmission of this step to the vertical deflection amplifier 45'. Although not accurately reproduced by the vertical deflection amplifier 45' on the deflection plates of the class B scope, the step does so accelerate the response of the deflection amplifier as to start the sweep trace almost linearly and with negligible delay in spite of the residual interelectrode capacitances. This provides substantial improvement of the display at very short ranges.

The centering of the range mark in the oscilloscope 25 may be adjusted by means of the potentiometer 413. The amount of expansion may be adjusted by means of the potentiometer 415. With this arrangement a change in the expansion adjustment makes necessary a readjustment of the centering. A change in the centering adjustment, however, does not appreciably affect the adjustment of the expansion.

Azimuth index mark

The azimuth index mark, more briefly referred to as the azimuth mark, is produced by brightening one complete trace of the vertical sweep. If it is desired not to rely upon the length of closure of the azimuth mark contact 60, provision may be made to time the brightening impulse electrically, starting with the initial closure of the contact. The operation is illustrated in graphs N, R and S of Fig. 6.

For this purpose there is provided a condenser 250 (Fig. 2) which is normally charged as through a resistor 251, to a positive potential, controlled in magnitude by the setting of a potentiometer 252. When the azimuth mark contact momentarily closes the condenser 250 is quickly discharged to ground, recharging slowly thereafter (graph R). The resultant voltage wave is passed by way of a condenser 253 and resistors 254, 255 and 256 to the control grid of a video amplifier tube V14. A delaying action is afforded by a condenser 257 which rounds the edges of this pulse (graph S) and thus eliminates sharp discontinuities at the beginning and end of the brightened part of the trace. As a result, the azimuth mark appears to be a single line, although (the antenna rotation not being synchronized with the pulse rate) it may actually consist of portions of two adjacent lines. Absence of sharp discontinuities aids in producing this illusion.

The voltage on the anode of the tube V14 is coupled through a pair of serially connected condensers 300 and 301 via lead 316 to the modulating grid 37 of the cathode-ray oscilloscope (Fig. 3). A control potential, adjustable by means of a potentiometer 303, is supplied to the grid 302 through a resistor 304. The condenser 301 which may be a high-voltage blocking condenser, is given a large value of capacitance, since it is required to pass an azimuth deblanking pedestal containing components of relatively very low frequency. As this condenser must also carry the video signals, it is preferably supported from the chassis on ceramic pedestals to minimize capacitance to ground.

Azimuth blanking

Azimuth blanking may be used in order to avoid an undesirable glow on the screen, produced by the active beam, during the period between azimuth sweeps, even though the beam is beyond the edge of the screen. The azimuth blanking contact 65, normally closed (graph M), passes current through a pair of resistors 305 and 306, to lower the potential at the junction of the condensers 300 and 301 by about 40 volts from that at the anode of V14. When this contact opens at the start of the azimuth sweep, the condenser 300 discharges through the resistor 306 (with a time constant which is short compared to the azimuth sweep period). On reclosure of the contact 65 soon after the end of the sweep, this charge is quickly restored. The result is an essentially rectangular pedestal (graph Q) at the junction of the condensers 300 and 301, which is coupled through the condenser 301, along with the video, range mark, azimuth mark and range deblanking signals to the grid 37 of the oscilloscope 25. A sketch illustrative of the result is shown in graph T (omitting video signals and the range mark). The background control is of course adjusted to supply sufficient bias with respect to the cathode of the oscilloscope 25 so that the superimposed range and azimuth deblanking pedestals extend just far enough above the cathode-ray tube cut-off potential to provide the desired background illumination.

Horizontal deflection amplifier

The horizontal deflection amplifier (Fig. 3), dealing with the azimuth sweep, is identical to the vertical amplifier except for the input circuit, which in the present case generates the sweep signal under control of the azimuth sweep contact 50. Closure of this contact momentarily (graph L, Fig. 6) at the start of the sweep completely discharges a previously charged condenser 307 through a resistor 308. When the contact 50 reopens, the condenser 307 is charged by current through a plurality of resistors 309 to 314, inclusive, to produce a rising voltage, as in graph O. The initial slope of the voltage transient is adjustable, by variation of the current in the resistor 312, under the control of the resistor 311, which may be a potentiometer as shown. The voltage divider comprises the resistors 313 and 314 provides a slightly reduced replica of the early part of the charging curve at a higher direct current potential suitable for the amplifier input. The amplifier comprises the vacuum tubes V7 and V8. Grid current drawn by the tube V7 limits the rise of the voltage in the replica, as shown in graph O. A condenser 315 is provided to protect against possible high frequency crosstalk onto the grid of V7. The amplifier anode potentials are illustrated in graph P.

A merit of this scheme is that the position of the beam at the start of the sweep is not affected by the horizontal expansion control, and that the expansion is also independent of the horizontal centering adjustment.

It will be evident that condenser discharging potentials may be substituted for charging potentials when preferred, without departing from the principles of the invention. Also, identical transient potentials may be impressed upon the control grids 123 and 201 instead of potentials differing by a substantially uniform amount, in which case the fixed reference potentials, represented by the cut-off potentials of V4 and V9.1 respectively, may be made to differ by a uniform amount, with the same result as regards the correlation of the start of the time sweep with the instant of production of the range mark.

What is claimed is:

1. A viewing system comprising a main viewing device presenting an over-all two-dimensional picture of an extended field of view, manually operable means marking in the picture presented by said main viewing device a selected point in the field of view, an auxiliary viewing device presenting a magnified picture of a restricted portion of the said field of view, and means to vary the center of said magnified picture in two dimensions to follow the said selected point in the over-all picture.

2. A viewing system comprising a main oscilloscope presenting an over-all two-dimensional picture of an extended field of view, manually operable means producing a visible mark upon the screen of said main oscilloscope at a selected point in the over-all picture, an auxiliary oscilloscope presenting a magnified picture of a restricted portion of the field of view of said main oscilloscope, and means to vary the center of the said magnified picture upon a point in the field of view corresponding in two dimensions to the said selected point marked in the over-all picture.

3. A viewing system comprising a main oscilloscope presenting an over-all picture of an extended field of view, means producing a radial mark in said over-all picture, means producing a concentric circular mark in said over-all picture, means to vary the angular position of said radial mark, means to vary the radial position of said circular mark, an auxiliary oscilloscope presenting a magnified picture of a restricted portion of the field of view of said main oscilloscope, and means to vary the center of the magnified picture to follow the intersection of said radial and circular marks in said over-all picture.

4. Arrangement for producing an indicating mark at a desired point in a time interval represented by a viewing device, said arrangement comprising means to maintain two transient potentials with a substantially constant potential difference therebetween, means to determine the start of the viewing interval with reference to one of said transient potentials, and means to produce the indicating mark with reference to the other of said transient potentials.

5. Arrangement for centering an indicating mark on a viewing device with respect to a time interval represented by said viewing device, said arrangement comprising means producing two transient potentials differing continually in magnitude by a substantially constant amount, means determining a steady potential, means actuated by balancing said steady potential against one of said transient potentials to start said viewing means in operation, and means actuated by balancing said steady potential against the other of said transient potentials to produce the desired indicating mark at a predetermined time after the start of operation of the viewing means.

6. Arrangement for correlating the start of a time sweep with the production of an indication, comprising a charging circuit having two output connections supplying respectively a pair of transient potentials of continually unequal magnitude, means determining a comparison value of fixed potential, means comparing each of said transient potentials with said fixed potential, means actuated by equality of said fixed potential and one of said transient potentials to start the time sweep potential, and means actuated by equality of said fixed potential and the other of said transient potentials to produce the said indication.

7. Arrangement for correlating the start of a time sweep with the production of an indication, comprising a charging circuit, two substantially independent output circuits connected with said charging circuit and deriving transient potentials therefrom, means associated with each of said output circuits comparing said respective transient potentials with comparison potentials of fixed value, means actuated by equality of one of said fixed potentials and one of said transient potentials to start the time sweep, and means actuated by equality of the other of said fixed potentials and the other of said transient potentials to produce the said indication.

8. Arrangement for correlating the start of a time sweep with the production of an indication, comprising a charging circuit, two substantially independent output circuits connected with said charging circuit and deriving transient potentials therefrom, means associated with each of said output circuits comparing said respective transient potentials with comparison potentials of fixed value, means actuated by a critical relationship of one of said comparison potentials and one of said transient potentials to start the time sweep, and means actuated by a critical relationship of the other comparison potential and the other transient potential to produce the said indication.

9. Arrangement for correlating the start of a time sweep with a reference indication, comprising first and second discharge devices each having a cathode, an anode and a control grid; a charging circuit having two output connections supplying a pair of transient potentials of continually unequal magnitude to the respective control grids of said space discharge devices, said first space discharge device receiving the transient potential of lesser magnitude, a potentiometer, a source of constant potential supplying charging current to said charging circuit and constant current to said potentiometer, means to oppose the potential across a selected portion of said potentiometer to the transient potential supplied to the control grid of said first space discharge device, whereby the said first space discharge device becomes conductive upon passing through a critical potential difference between its cathode and control grid to give the desired indication, and means to oppose said potential across the said portion of the potentiometer to the transient potential supplied to the control grid of said second space discharge device, whereby the said second space discharge device becomes conductive upon passing through a critical potential difference between its cathode and control grid to start a sweep potential in advance of the occurrence of the indication given by said first space discharge device.

LARNED A. MEACHAM.

REFERENCES CITED

The following references are of record in the file of this patent:

UNITED STATES PATENTS

| Number | Name | Date |
|---|---|---|
| 2,355,363 | Christaldi | Aug. 8, 1944 |

FOREIGN PATENTS

| Number | Country | Date |
|---|---|---|
| 552,072 | Great Britain | Mar. 22, 1943 |